(12) United States Patent
Hirao et al.

(10) Patent No.: US 12,162,322 B2
(45) Date of Patent: Dec. 10, 2024

(54) SUSPENSION CONTROL APPARATUS

(71) Applicant: Hitachi Astemo, Ltd., Hitachinaka (JP)

(72) Inventors: Ryusuke Hirao, Hitachinaka (JP); Nobuyuki Ichimaru, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 538 days.

(21) Appl. No.: 17/440,435

(22) PCT Filed: Jan. 28, 2020

(86) PCT No.: PCT/JP2020/002902
§ 371 (c)(1),
(2) Date: Sep. 17, 2021

(87) PCT Pub. No.: WO2020/195113
PCT Pub. Date: Oct. 1, 2020

(65) Prior Publication Data
US 2022/0161624 A1    May 26, 2022

(30) Foreign Application Priority Data

Mar. 27, 2019 (JP) ................................. 2019-060489

(51) Int. Cl.
| | | |
|---|---|---|
| *B60G 17/016* | (2006.01) | |
| *B60G 17/018* | (2006.01) | |
| *B60G 17/019* | (2006.01) | |

(52) U.S. Cl.
CPC ......... *B60G 17/016* (2013.01); *B60G 17/018* (2013.01); *B60G 17/019* (2013.01); *B60G 2400/204* (2013.01); *B60G 2400/82* (2013.01)

(58) Field of Classification Search
None
See application file for complete search history.

(56) References Cited

U.S. PATENT DOCUMENTS 8,160,781 B2 * 4/2012 Naono ................ G05B 13/024
701/99
8,451,140 B2 * 5/2013 Piccinini .............. G08G 1/0112
340/901

(Continued)

FOREIGN PATENT DOCUMENTS

JP    2-227311    9/1990
JP    11-42918    2/1999

(Continued)

OTHER PUBLICATIONS

International Search Report issued Apr. 14, 2020 in corresponding International Application No. PCT/JP2020/002902, with English translation.

(Continued)

*Primary Examiner* — Jonathan M Dager
(74) *Attorney, Agent, or Firm* — Wenderoth, Lind & Ponack, L.L.P.

(57) ABSTRACT

A suspension control apparatus includes: a variable damper; a communication unit provided inside a vehicle to receive a dynamic map from a cloud; and a controller configured to adjust a force generated by the variable damper. The controller includes: a state estimation unit, which is provided inside the vehicle, and is configured to detect a motion of the vehicle; an operation-stability controller configured to calculate an $A_{FB}$ command value for the variable damper based on internal information output from the state estimation unit; and a dynamic-map controller configured to calculate an FF command value for the variable damper based on the dynamic map received from the communication unit. The controller determines a command value for the variable damper from the $A_{FB}$ command value and the FF command value.

10 Claims, 6 Drawing Sheets

(56) References Cited

U.S. PATENT DOCUMENTS

| | | | | |
|---|---|---|---|---|
| 9,156,328 | B2* | 10/2015 | Kikuchi | B60T 7/12 |
| 9,662,955 | B2* | 5/2017 | Popham | B60G 17/019 |
| 9,682,602 | B2* | 6/2017 | Morita | B60G 17/015 |
| 9,809,077 | B2* | 11/2017 | Stoof | B60G 17/016 |
| 9,902,229 | B2* | 2/2018 | Mettrick | B60G 17/0182 |
| 10,144,263 | B2* | 12/2018 | Mori | B60G 17/015 |
| 10,147,002 | B2* | 12/2018 | Hartmann | G06T 3/40 |
| 10,160,281 | B2* | 12/2018 | Rhode | B60G 17/0165 |
| 10,160,447 | B2* | 12/2018 | Lavoie | B60W 50/00 |
| 10,328,761 | B2* | 6/2019 | Sugimoto | B60G 17/08 |
| 10,363,790 | B2* | 7/2019 | Hoffmann | B60G 17/02 |
| 10,406,882 | B2* | 9/2019 | Lakehal-Ayat | B60G 17/0182 |
| 10,654,333 | B2* | 5/2020 | Schindler | G06V 20/56 |
| 10,828,953 | B2* | 11/2020 | Anderson | B60G 17/0195 |
| 11,312,199 | B2* | 4/2022 | Sohn | B60G 17/018 |
| 11,358,432 | B2* | 6/2022 | Hirao | F16F 9/535 |
| 11,486,720 | B2* | 11/2022 | Blumentritt | B60W 10/20 |
| 11,654,739 | B2* | 5/2023 | Kim | B60G 17/0165 280/5.515 |
| 11,708,109 | B2* | 7/2023 | Hirao | B60G 15/02 701/41 |
| 11,807,063 | B2* | 11/2023 | Furuta | B60G 17/0165 |
| 11,884,278 | B2* | 1/2024 | Guan | B60W 30/18 |
| 2008/0004770 | A1* | 1/2008 | Masamura | B60G 17/018 701/37 |
| 2008/0234900 | A1* | 9/2008 | Bennett | B60G 17/0195 701/48 |
| 2009/0043452 | A1* | 2/2009 | Sekiya | F16F 9/535 701/40 |
| 2009/0097038 | A1* | 4/2009 | Higgins-Luthman | B60G 17/019 356/602 |
| 2010/0121529 | A1* | 5/2010 | Savaresi | B60G 17/018 701/37 |
| 2012/0041643 | A1* | 2/2012 | Proemm | B60G 17/08 701/37 |
| 2013/0103259 | A1* | 4/2013 | Eng | B60G 17/0165 701/37 |
| 2014/0095024 | A1* | 4/2014 | Hirao | B60G 17/08 701/37 |
| 2014/0195112 | A1* | 7/2014 | Lu | B60G 17/015 703/2 |
| 2014/0297116 | A1* | 10/2014 | Anderson | B60G 11/265 701/37 |
| 2014/0297119 | A1* | 10/2014 | Giovanardi | B60G 17/016 701/38 |
| 2015/0066295 | A1* | 3/2015 | Kanda | B60G 17/01933 701/38 |
| 2016/0159189 | A1* | 6/2016 | Hirao | B60G 17/06 701/37 |
| 2016/0318365 | A1* | 11/2016 | Sivaraman | G01S 17/88 |
| 2016/0347142 | A1* | 12/2016 | Seong | B60G 17/0195 |
| 2017/0137023 | A1* | 5/2017 | Anderson | B60W 10/20 |
| 2017/0267049 | A1* | 9/2017 | Kubota | B60G 17/06 |
| 2018/0141543 | A1* | 5/2018 | Krosschell | B60G 17/0195 |
| 2018/0154723 | A1* | 6/2018 | Anderson | H02K 7/1823 |
| 2018/0320751 | A1* | 11/2018 | Kadokura | F16F 9/325 |
| 2018/0361814 | A1* | 12/2018 | Ohno | B60G 17/0152 |
| 2019/0184978 | A1* | 6/2019 | Park | B60W 10/20 |
| 2019/0359203 | A1* | 11/2019 | Isshiki | B60W 30/025 |
| 2020/0198431 | A1* | 6/2020 | Isshiki | B60G 17/018 |
| 2021/0012131 | A1* | 1/2021 | Kim | G06T 7/50 |
| 2021/0347221 | A1* | 11/2021 | Park | B60G 17/019 |
| 2022/0105769 | A1* | 4/2022 | Chetty | B60G 17/0162 |
| 2022/0281280 | A1* | 9/2022 | Praet | B60G 17/06 |
| 2023/0152106 | A1* | 5/2023 | Giovanardi | G01C 21/3492 701/533 |

FOREIGN PATENT DOCUMENTS

| | | |
|---|---|---|
| JP | 2010-83329 | 4/2010 |
| JP | 2013-49394 | 3/2013 |
| JP | 2014-69759 | 4/2014 |

OTHER PUBLICATIONS

English translation of the Written Opinion of the International Searching Authority issued Apr. 14, 2020 in corresponding International Application No. PCT/JP2020/002902.

* cited by examiner

Fig. 7

SUSPENSION CONTROL APPARATUS

TECHNICAL FIELD

The present invention relates to a suspension control apparatus to be installed in a vehicle, for example, an automobile.

BACKGROUND ART

There has been known a suspension control apparatus for detecting or estimating a vehicle state and control a suspension in accordance with a result of the detection or estimation (see Patent Literature 1). Further, there has been known a suspension control apparatus configured to acquire a road surface condition forward of a vehicle with use of an exterior recognition sensor, for example, a camera and control a suspension in accordance with the road surface condition having been acquired (preview control) (see Patent Literature 2).

CITATION LIST

Patent Literature

PTL 1: JP 2014-069759 A1
PTL 2: JP 11-42918 A1

SUMMARY OF INVENTION

Technical Problem

Incidentally, in the case of controlling a suspension in accordance with a vehicle state, various sensors are required for acquiring the vehicle state. Thus, when the number of sensors such as an acceleration sensor, a vehicle height sensor, and an exterior recognition sensor increases, a system is complicated, and a manufacturing cost is high.

Further, in the case of performing the preview control, only a limited range forward of a vehicle can be detected, and a detection range is narrow. Thus, controllable conditions are limited to, for example, during a low vehicle speed, or during daytime with a fine weather which enables image recognition.

Further, in the related art, parameters for a control logic are parameters optimized under certain conditions. Thus, a command value which is optimum for any road surface is not necessarily obtained.

The present invention has an object to provide a suspension control apparatus which is capable of performing preview control without an exterior recognition sensor and obtaining a command value which is optimum for any road surface.

Solution to Problem

According to one embodiment of the present invention, there is provided a suspension control apparatus, including: a force generating mechanism, which is provided between a vehicle body side and a wheel side of a vehicle, and is allowed to adjust a force to be generated; a receiving unit, which is provided inside the vehicle, and is configured to receive external information from an external database provided outside the vehicle; and a control device, which is provided inside the vehicle, and is configured to adjust the force generated by the force generating mechanism, in which the control device includes: a motion detector, which is provided inside the vehicle, and is configured to detect a motion of the vehicle; an internal command calculation unit configured to calculate a first command value for the force generating mechanism based on internal information output from the motion detector; and an external command calculation unit configured to calculate a second command value for the force generating mechanism based on the external information received from the receiving unit, and in which the control device determines a command value for the force generating mechanism from the first command value and the second command value.

With the suspension control apparatus according to one embodiment of the present invention, preview control can be performed without an exterior recognition sensor, and a command value which is optimum for any road surface can be obtained.

DESCRIPTION OF EMBODIMENTS

With reference to the accompanying drawings, detailed description is now given of a suspension control apparatus according to each embodiment of the present invention while exemplifying a case in which this suspension control apparatus is applied to a four-wheeled vehicle.

Figure 1:
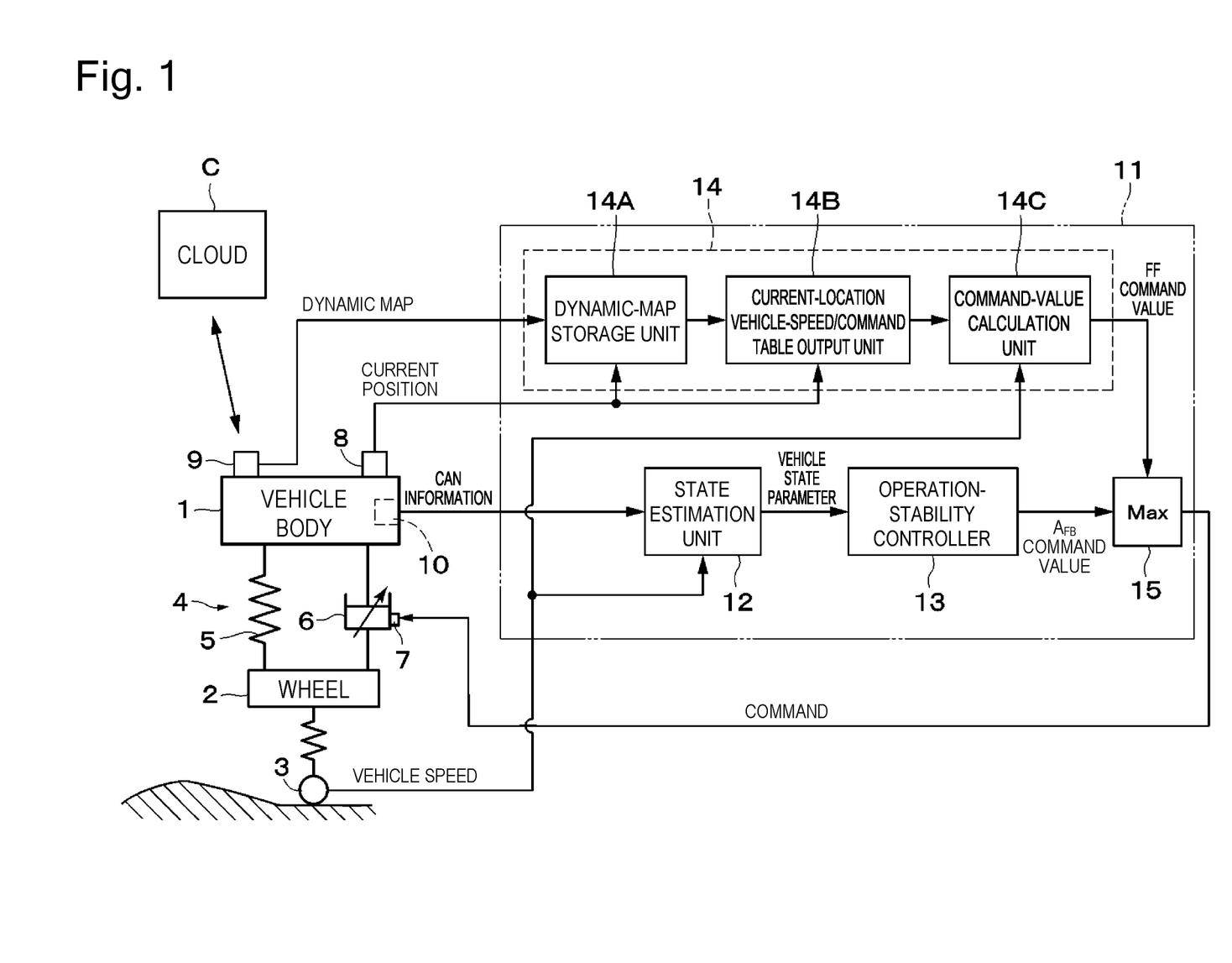
FIG. 1 is an overall configuration diagram for illustrating a suspension control apparatus according to a first embodiment of the present invention.

FIG. 1 shows a suspension control apparatus according to a first embodiment. In FIG. 1, on a lower side of a vehicle body 1 forming a body of a vehicle, there are provided, for example, right and left front wheels and right and left rear wheels (hereinafter collectively referred to as "wheel 2"). Those wheels 2 each include a tire (not shown). This tire acts as a spring for absorbing fine roughness of a road surface.

A vehicle-speed sensor 3 detects, for example, a rotation number of the wheel 2 (that is, tire) and output the rotation number as vehicle-speed (traveling speed of vehicle) information to a controller 11 described later. The controller 11 acquires a vehicle speed based on the vehicle-speed information from the vehicle-speed sensor 3. In this case, the vehicle-speed sensor 3 forms a vehicle-speed detector for detecting or estimating the vehicle speed. The controller 11 is not limited to the one configured to acquire the vehicle speed based on the vehicle-speed information from the vehicle-speed sensor 3, and may acquire the vehicle speed from, for example, a controller area network (CAN) 10.

A suspension device 4 is provided in such a manner as to be interposed between the vehicle body 1 and the wheel 2. The suspension device 4 includes a suspension spring 5 (hereinafter referred to as "spring 5") and a damping-force adjustment-type shock absorber (hereinafter referred to as "variable damper 6") arranged in a parallel relationship with the spring 5 and provided between the vehicle body 1 and the wheel 2. FIG. 1 schematically shows a case in which one suspension device 4 is provided between the vehicle body 1 and the wheel 2. In the case of the four-wheeled vehicle, four suspension devices 4 in total are individually and independently provided between four wheels 2 and the vehicle body 1.

Here, the variable damper 6 of the suspension device 4 is a force generating mechanism, which is provided between the vehicle body 1 side and the wheel 2 side and is capable of adjusting a force to be generated. The variable damper 6 is formed of a hydraulic shock absorber of a damping-force adjustment type. A damping-force variable actuator 7 formed of, for example, a damping-force adjustment valve is provided to the variable damper 6 in order to continuously adjust a characteristic of a generated damping force (that is, a damping-force characteristic) from a characteristic of being hard (hard characteristic) to a characteristic of being soft (soft characteristic). A command electric current (command signal) given in accordance with a command value is input to the damping-force variable actuator 7 from the controller 11. The damping-force variable actuator 7 adjusts a damping force generated by the variable damper 6 in accordance with the command value.

It is not always required that the damping-force variable actuator 7 continuously adjust the damping-force characteristic. The damping-force variable actuator 7 may be capable of adjusting a damping force in a plurality of stages, for example, two or more stages. Further, the variable damper 6 may be of a pressure control type or a flow-rate control type.

A GPS receiver 8 is provided to the vehicle body 1 for receiving a signal from a global positioning system (GPS) satellite (hereinafter referred to as "GPS signal"). The GPS receiver 8 calculates a current position of the vehicle based on the GPS signal. The GPS receiver 8 outputs information of the current position to the controller 11. The current position of the vehicle may be estimated not only by the acquisition from the GPS receiver 8 but also by technologies such as a vehicle-speed sensor, a gyro, or matching with a map.

A communication unit 9 is a receiving unit provided inside the vehicle. The communication unit 9 receives a dynamic map serving as external information from a cloud C being an external database provided outside the vehicle. The cloud C (cloud computing) provides a service to a user via a network. The communication unit 9 is provided to the vehicle body 1 for communicating with the external cloud C. For example, when a destination is set on the vehicle side, the communication unit 9 sends information of a destination and a current position to the cloud C. The cloud C determines a traveling path from the current position to the destination and calculates a vehicle-speed plan for the traveling on the path. The communication unit 9 receives (downloads) a dynamic map of a vicinity of the current position including a path plan, which includes the path and the vehicle speed having been calculated, and a command value for the suspension device 4 (variable damper 6), which is given in accordance with the position and the vehicle speed, from the cloud C. The dynamic map having been downloaded is stored in a dynamic-map storage unit 14A of the controller 11. In this case, the dynamic map is a digital map obtained by combining a static high-accuracy map with dynamic position information such as traffic jam information and traffic regulation. The dynamic map also includes an optimum command value given in accordance with a position on the map and a vehicle speed.

A CAN 10 is provided to the vehicle body 1. The CAN 10 receives transmission of CAN information including various vehicle state parameters such as a forward acceleration, a backward acceleration, a lateral acceleration, a yaw rate, and a steering angle. The CAN 10 is connected to the controller 11. The CAN 10 outputs the CAN information to the controller 11.

The controller 11 is a control device provided inside the vehicle for adjusting a force generated by the variable damper 6. The controller 11 includes a state estimation unit 12, an operation-stability controller 13, a dynamic-map controller 14, and a maximum-value selection unit 15.

The state estimation unit 12 is a motion detector provided inside the vehicle to detect a motion of the vehicle. The state estimation unit 12 estimates a state of the vehicle based on the CAN information from the CAN 10 and the vehicle speed from the vehicle-speed sensor 3. The vehicle speed is not required to be directly acquired from the vehicle-speed sensor 3 and may be acquired via the CAN 10.

In this case, the CAN information includes various vehicle state parameters such as a forward acceleration, a backward acceleration, a lateral acceleration, a yaw rate, and a steering angle of the vehicle. However, the vehicle state parameters include a delay time and noise. In view of this, the state estimation unit 12 estimates a state of the vehicle such as forward, backward, rightward, and leftward translation and yaw based on the vehicle state parameters acquired through, for example, the CAN information. Based on the estimated state of the vehicle, the state estimation unit 12 compensates for the delay time and removes noise with regard to the vehicle state parameters having been acquired. The state estimation unit 12 calculates vehicle state parameters (for example, forward acceleration, backward acceleration, lateral acceleration, and yaw rate) with regard to which, for example, the compensation for the delay time has been performed, and outputs internal information including the vehicle state parameters having been calculated to the operation-stability controller 13.

The operation-stability controller 13 is an internal command calculation unit for calculating a first command value for the variable damper 6 (force generating mechanism) based on the vehicle state parameters (internal information) output from the state estimation unit 12 (motion detector). The operation-stability controller 13 calculates such an operation-stability feedback command value (hereinafter referred to as "Am command value") that, for example, the damping-force characteristic of the variable damper 6 becomes harder as the lateral acceleration becomes larger. In this case, the $A_{FB}$ command value is a first command value calculated based on the vehicle state parameters output from the state estimation unit 12.

The dynamic-map controller 14 is an external command calculation unit for calculating a second command value for the variable damper 6 based on the dynamic map (external information) received from the communication unit 9. The dynamic-map controller 14 calculates such a feedforward command value (hereinafter referred to as "FF command value") that, in accordance with the current position and the vehicle speed of the vehicle, based on the dynamic map, the damping-force characteristic of the variable damper 6 becomes harder or softer. In this case, the FF command value is a second command value calculated based on the dynamic map received from the communication unit 9.

The dynamic-map controller 14 includes the dynamic-map storage unit 14A, a current-location vehicle-speed/command table output unit 14B, and a command-value calculation unit 14C. The dynamic-map storage unit 14A downloads a dynamic map, which includes position information of a road surface and a control command value optimized for the vehicle speed, in accordance with a current position and temporarily stores data on the path plan.

The current-location vehicle-speed/command table output unit 14B reads a vehicle-speed/command table corresponding to the current position from the dynamic map based on the current position and outputs the same. When the current position is not present on the dynamic map, the current-location vehicle-speed/command table output unit 14B outputs a vehicle-speed/command table having a certain command value determined in advance (for example, fixed to soft, fixed to hard, or fixed to an intermediate value between the soft and the hard).

The command-value calculation unit 14C calculates an FF command value given in accordance with a current vehicle speed based on the vehicle-speed/command table output from the current-location vehicle-speed/command table output unit 14B. The command-value calculation unit 14C outputs the FF command value to the maximum-value selecting unit 15.

The maximum-value selecting unit 15 compares the $A_{FB}$ command value output from the operation-stability controller 13 with the FF command value output from the dynamic-map controller 14, and selects a command value on the hard side (large value) as a final command value. In such a manner, the controller 11 determines a command value for the variable damper 6 from the $A_{FB}$ command value and the FF command value. The maximum-value selecting unit 15 outputs a command signal (command electric current) given in accordance with the selected command value to the damping-force variable actuator 7. In such a manner, the controller 11 controls the damping force generated by the variable damper 6 in accordance with the command value.

The suspension control apparatus according to this embodiment has the above-mentioned configuration, and operation thereof is described next with reference to FIG. 1.

First, when destination setting is performed from the vehicle side, the communication unit 9 sends a current position and a destination of the vehicle to the cloud C. The cloud C determines a traveling path from the current position to the destination and calculates a vehicle-speed plan for the traveling on the path. The dynamic map of a vicinity of the current location including a path plan (path and vehicle speed) having been calculated and a command value for the variable damper 6 given in accordance with the position and the vehicle speed is downloaded from the cloud C to the controller 11.

When the vehicle starts traveling, the dynamic-map controller 14 of the controller 11 calculates FF command values for variable dampers 6 of four wheels based on the dynamic map in accordance with the current position and the vehicle speed. With the use of the FF command values, the controller 11 can perform feedforward control on the damping force generated by the variable damper 6 in accordance with roughness and curve of a road surface stored in the cloud C. In such a manner, ride comfort and operation stability of the vehicle can be improved.

However, in some cases, traveling cannot be performed as scheduled by the path plan due to, for example, traffic signals and parking vehicles. Thus, the controller 11 calculates the $A_{FB}$ command value for the variable damper 6 based on the CAN information (forward acceleration, backward acceleration, lateral acceleration, yaw rate, and steering angle). With the use of the $A_{FB}$ command value, the controller 11 performs feedback control on the damping force generated by the variable damper 6. In such a manner, the suspension control apparatus according to this embodiment is capable of dealing with a vehicle behavior which may not occur in accordance with the path plan.

Figure 2:
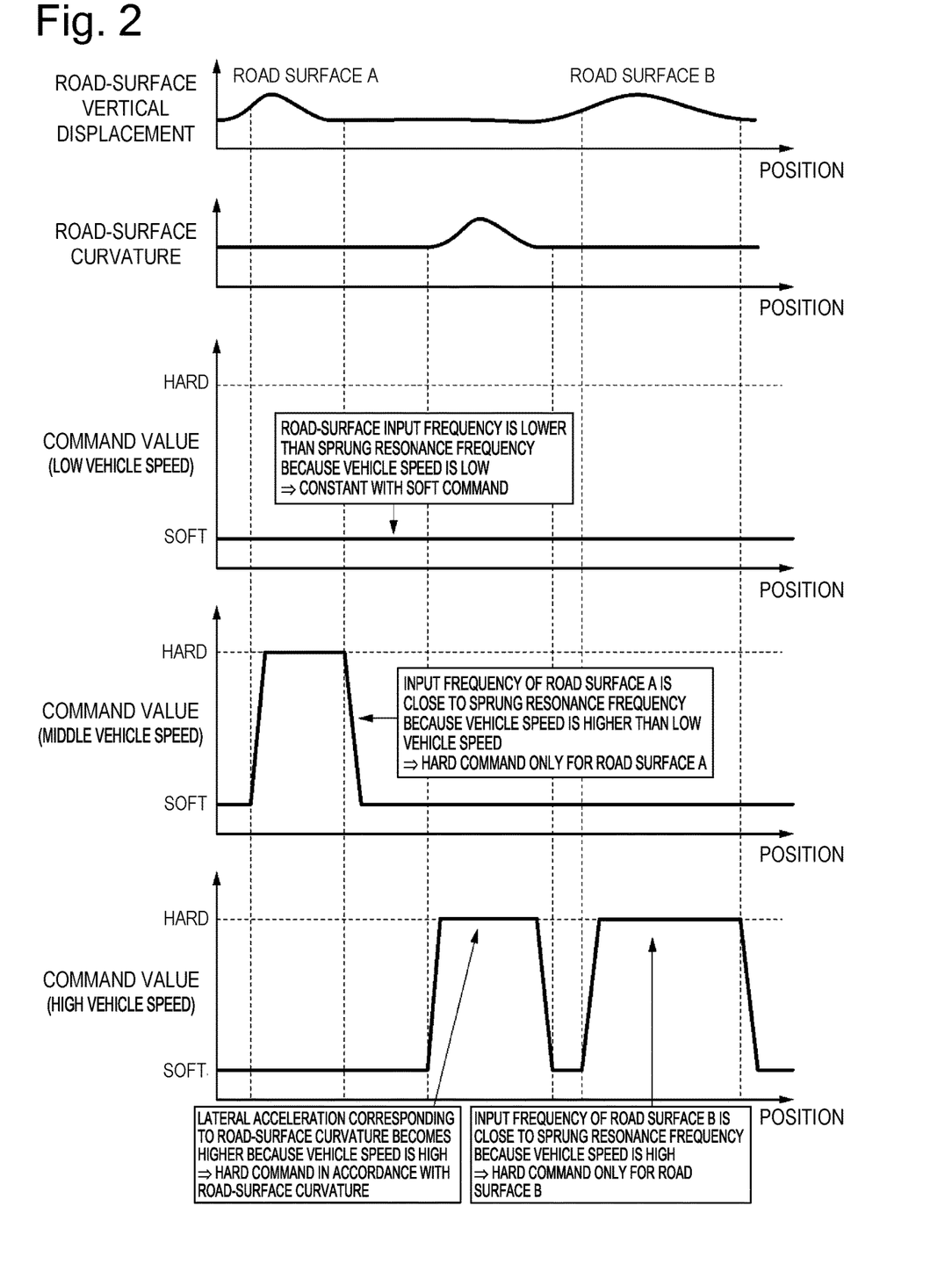
FIG. 2 is an explanatory graph for showing examples of road-surface vertical displacement, a road-surface curvature, and command values based on a dynamic map.

Next, FIG. 2 shows an example of a relationship among road-surface displacement, a road-surface curvature, a command value (second command value), a position, and a vehicle speed, which are stored in the dynamic map. In this dynamic map, there is stored a map of the command value, the position, and the vehicle speed downloaded from the cloud C. Based on the dynamic map, a command value based on a current position and a vehicle speed is determined. The example shown in FIG. 2 assumes a case in which a road surface A and a road surface B having different wavelengths are included in the traveling path.

When the vehicle speed is low (in the case of low vehicle speed), in both of the road surface A and the road surface B, a road-surface input frequency is lower than a sprung resonance frequency, and hence the sprung part does not vibrate. Accordingly, the command value of the dynamic map becomes constant with a command for making the variable damper 6 be soft (soft command).

When the vehicle speed is higher than the low vehicle speed and lower than a high vehicle speed (in the case of middle vehicle speed), an input frequency of the road surface A is close to the resonance frequency. Thus, in order to perform control of making the variable damper 6 be hard only on the road surface A, the command value of the dynamic map is switched at the position of the road surface A from the soft command to a hard command (command for making the variable damper 6 be hard).

When the vehicle speed is higher than the middle vehicle speed (in the case of the high vehicle speed), an input frequency of the road surface B is close to the resonance frequency. Thus, in order to perform control of making the variable damper 6 be hard only on the road surface B, the command value of the dynamic map is switched at the position of the road surface B from the soft command to the hard command.

Further, in the case of the high vehicle speed, a lateral acceleration equal to or higher than a value determined in advance in accordance with the road-surface curvature occurs. That is, the lateral acceleration becomes higher only when the vehicle speed is high. Thus, the command value of the dynamic value is switched from the soft command to the hard command at a position at which the lateral acceleration becomes higher in accordance with the road-surface curvature.

Next, in order to check an effect of the suspension apparatus according to this embodiment, comparison was made on respective command values of a case in which the feedback control is performed as in the related art without the cloud C and a case in which the feedforward control based on the dynamic map from the cloud C is performed. The command value of the feedforward control is determined in advance in accordance with a position of the road surface.

Figure 3:
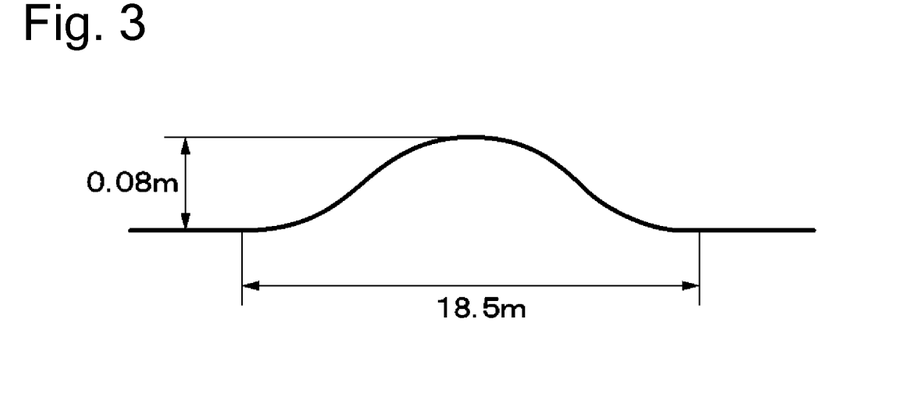
FIG. 3 is an explanatory view for illustrating an example of a road-surface shape used for a simulation.

Simulation conditions were based on vehicle specifications assuming an E-segment sedan. As a simulation model, a ¼ vehicle model in consideration of a sprung mass and an unsprung mass was used. The undulating road illustrated in FIG. 3 was given as a road surface to check basic sprung damping performance. A simulation was performed with regard to a case in which a vehicle travels at 80 km/h.

Figure 4:
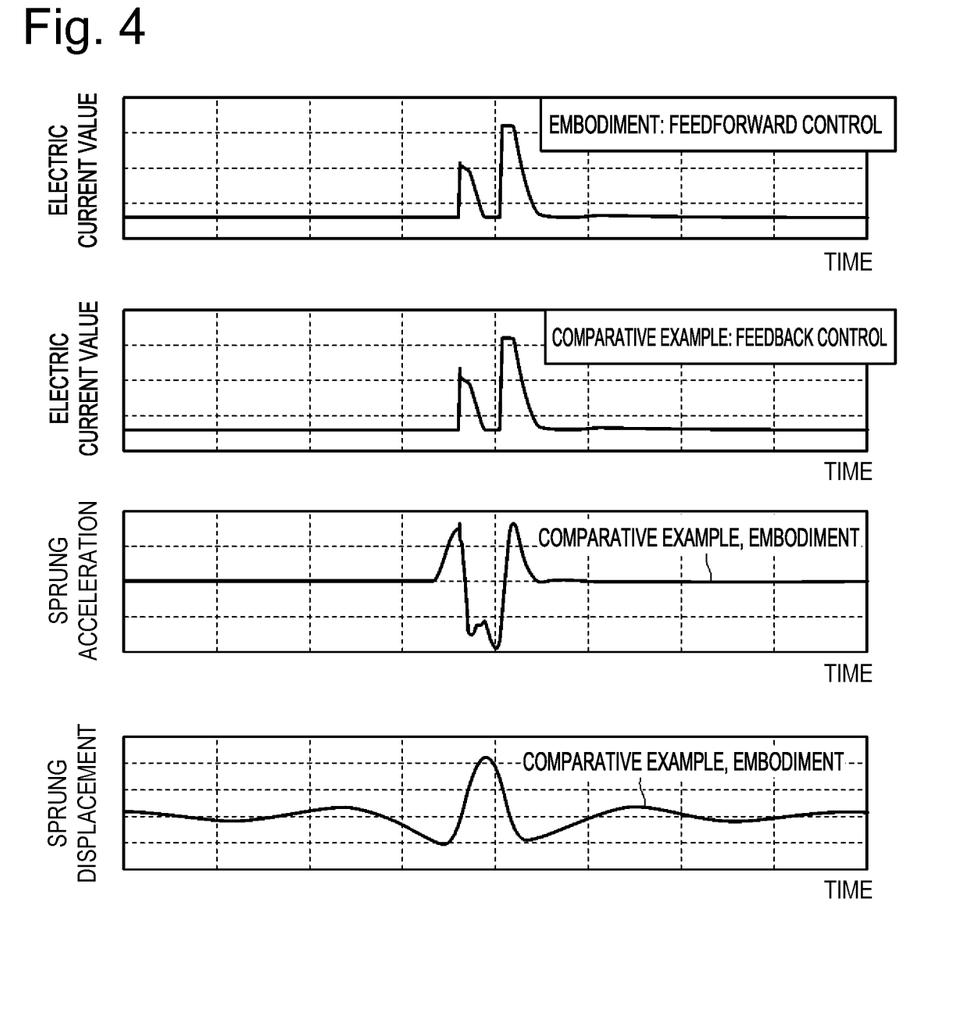
FIG. 4 is a characteristic chart for showing temporal changes in an electric current value of an electric current supplied to a damping-force variable actuator, a sprung acceleration, and sprung displacement.

Skyhook control was adopted as a feedback control law. The feedforward control using the cloud C is a control law in which a skyhook control command is stored in accordance with a position. Simulation results are shown in FIG. 4. As shown in FIG. 4, the electric current value (command value) given by the feedforward control in conformity with the dynamic-map information according to this embodiment substantially matches an electric current value (command value) given by the related-art feedback control shown as a comparative example. In addition, the sprung acceleration and the sprung displacement shown in FIG. 4 given in the comparative example and in this embodiment substantially match. Thus, it can be seen that the feedforward control in conformity with the dynamic-map information according to this embodiment achieves performance equivalent to the related-art feedback control shown as a comparative example. Accordingly, it can be seen that, even with the feedforward control in conformity with the position information without a sensor, the damping performance equivalent to that of the related-art feedback control can be achieved, and equivalent performance can be achieved while reducing the cost.

In this way, according to this embodiment, the suspension control apparatus includes: the variable damper 6 (force generating mechanism), which is provided between the vehicle body 1 side and the wheel 2 side of the vehicle, and is allowed to adjust a force to be generated; the communication unit 9 (receiving unit), which is provided inside the vehicle for receiving the dynamic map (external information) from the cloud C (external database) provided outside the vehicle; and the controller 11 (control device) provided inside the vehicle for adjusting the force generated by the variable damper 6.

In addition, the controller 11 includes: the state estimation unit 12 (motion detector), which is provided inside the vehicle for detecting a motion of the vehicle; the operation-stability controller 13 (internal command calculation unit) for calculating the $A_{FB}$ command value (first command value) for the variable damper 6 based on vehicle state parameters (internal information) output from the state estimation unit 12; and the dynamic-map controller 14 (external command calculation unit) for calculating the FF command value (second command value) for the variable damper 6 based on the dynamic map received from the communication unit 9, and the controller 11 determines a command value for the variable damper 6 from the $A_{FB}$ command value and the FF command value.

Accordingly, as long as the communication unit 9 is provided, the controller 11 can download the FF command value given in accordance with, for example, the current position and the vehicle speed of the vehicle. Thus, for example, even when an exterior recognition sensor is not provided, the variable damper 6 can be controlled by the preview control, thereby being capable of improving ride comfort or performance such as operation stability.

Further, the controller 11 controls the variable damper 6 with a combination of the $A_{FB}$ command value for performing the feedback control by the operation-stability controller 13 and the FF command value for performing the feedforward control by the dynamic-map controller 14. Thus, the control command can be changed before passage on the road surface with the FF command value, and control of the variable damper 6 in accordance with a vehicle state with the $A_{FB}$ command value is also possible. As a result, a damping effect for the vehicle can be enhanced.

The controller 11 determines a command value for the variable damper 6 with use of the FF command value for performing the feedforward control by the dynamic-map controller 14. Thus, the controller 11 can determine the command value with respect to the variable damper 6 in such a manner that the control command value is optimized based on road-surface information with regard to a road surface to be traveled. Consequently, the controller 11 can determine a command value which is optimum for any road surface.

Further, the operation-stability controller 13 calculates the $A_{FB}$ command value based on the CAN information provided to the vehicle. Thus, it is not required to provide a new sensor such as an acceleration sensor only for performing the suspension control, thereby being capable of simplifying the system and reducing the manufacturing cost.

Further, the dynamic map is an FF command value for the variable damper 6 determined in accordance with the road surface and the vehicle speed. Thus, the dynamic-map controller 14 can calculate an FF command value based on the dynamic map in accordance with a road surface on which the vehicle travels and a vehicle speed given at the time of traveling.

Figure 5:
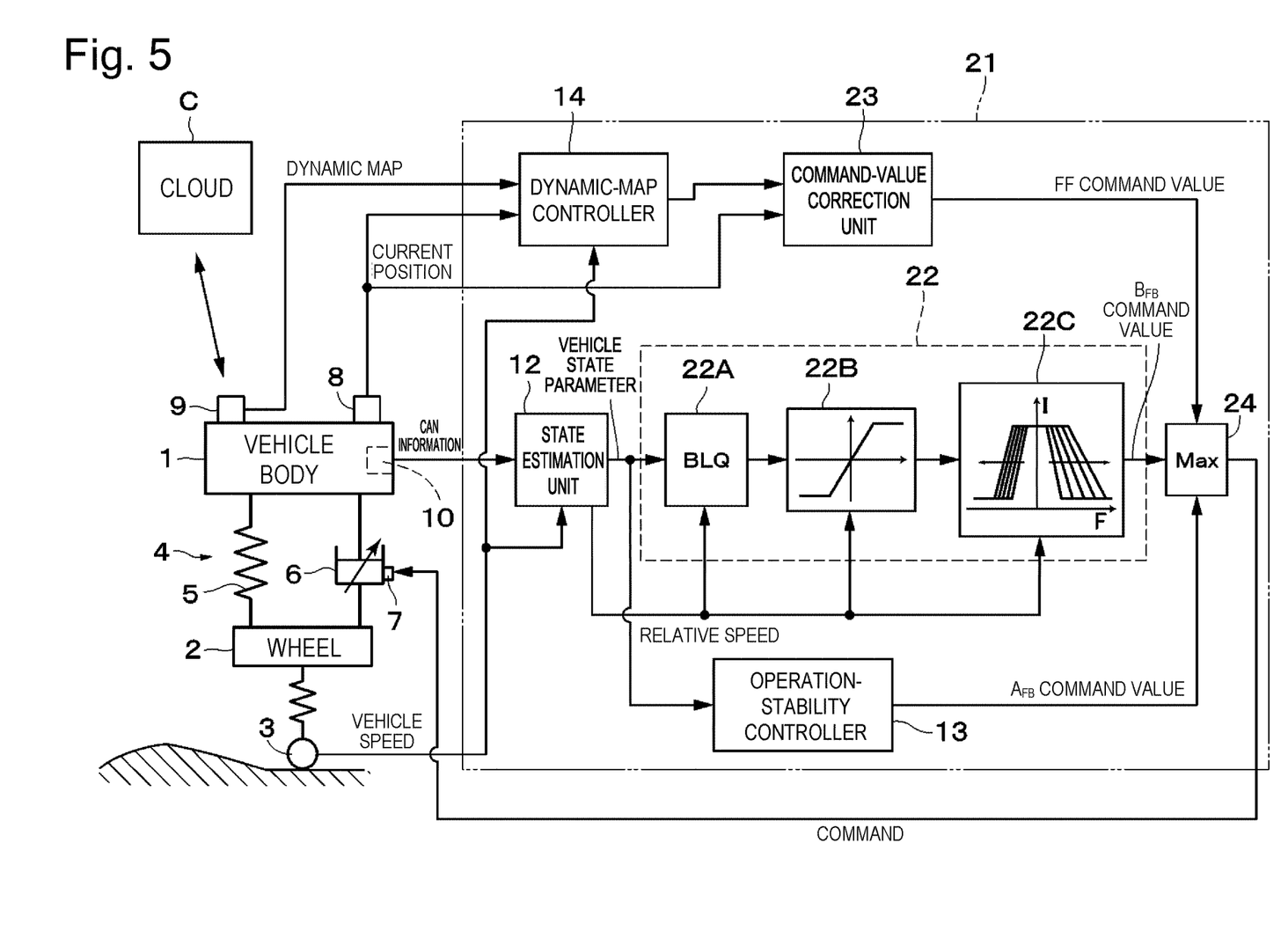
FIG. 5 is an overall configuration diagram for illustrating a suspension control apparatus according to a second embodiment of the present invention.

Next, FIG. 5 shows a second embodiment. The second embodiment is characterized in that ride-comfort control is added to the feedback control. In the second embodiment, the same components as those of the first embodiment described above are denoted by the same reference symbols, and a description thereof is omitted.

A controller 21 of the second embodiment has substantially the same configuration as that of the controller 11 of the first embodiment, and is a control device provided inside the vehicle for adjusting a force generated by the variable damper 6. The controller 21 is formed of, for example, a microcomputer.

As illustrated in FIG. 5, the controller 21 includes the state estimation unit 12, the operation-stability controller 13, a ride-comfort controller 22, the dynamic-map controller 14, a command-value correction unit 23, and a maximum-value selection unit 24.

The ride-comfort controller 22 is an internal command calculation unit for calculating a first command value for the variable damper 6 (force generating mechanism) based on the vehicle state parameters (internal information) output from the state estimation unit 12 (motion detector). The ride-comfort controller 22 includes a bilinear optimal controller 22A (hereinafter referred to as "BLQ 22A"), a damping-coefficient limit unit 22B, and a damping-force map 22C. The ride-comfort controller 22 outputs a ride-comfort feedback command value (hereinafter referred to as "$B_{FB}$ command value") for reducing sprung vertical vibration based on vehicle state parameters including a sprung speed output from the state estimation unit 12 and a relative speed between a sprung part (vehicle body 1) and an unsprung part (wheel 2) output from the state estimation unit 12. In this case, the $B_{FB}$ command value is a first command value calculated based on the vehicle state parameters output from the state estimation unit 12.

The BLQ 22A receives input of the vehicle state parameters output from the state estimation unit 12 and, in addition, input of the relative speed between the sprung part (vehicle body 1) and the unsprung part (wheel 2) output from the state estimation unit 12. Based on the bilinear optimal control theory, the BLQ 22A calculates a damping coefficient (target damping coefficient) of the variable damper 6 for reducing the vertical vibration of the sprung part from the vehicle state parameters and the relative speed output from the state estimation unit 12.

The damping-coefficient limit unit 22B receives input of the damping coefficient output from the BLQ 22A and input of the relative speed output from the state estimation unit 12. The damping-coefficient limit unit 22B independently limits a positive value and a negative value of the maximum value of the damping coefficient, respectively. The damping-coefficient limit unit 22B adds limitation on the maximum value of the damping coefficient based on the relative speed in the vertical direction between the vehicle body 1 and the wheel 2.

The damping-force map 22C receives input of the damping coefficient output from the damping-coefficient limit unit 22B and input of the relative speed output from the state estimation unit 12. The damping-force map 22C is a map in which a relationship between a target damping coefficient and a command value is variably set in accordance with the relative speed. The damping-force map 22C calculates a $B_{FB}$ command value (first command value) to be output to the damping-force variable actuator 7 based on the damping coefficient output from the damping-coefficient limit unit 22B and the relative speed output from the state estimation unit 12.

The command-value correction unit 23 receives input of the FF command value output from the dynamic-map controller 14 and a current position of the vehicle output from the GPS receiver 8. The command-value correction unit 23 compares the path plan determined by the cloud C and a current position. When it is determined that the current position follows the path plan, the command-value correction unit 23 outputs the FF command value output from the dynamic-map controller 14 as it is. Meanwhile, when it is determined that the current position deviates from the path plan, the command-value correction unit 23 corrects the FF command value output from the dynamic-map controller 14 to zero. In this case, the $A_{FB}$ command value from the operation-stability controller 13 or the $B_{FB}$ command value from the ride-comfort controller 22 becomes a larger value (value on the hard side) than the FF command value. Thus, the command for the feedback control (first command value) based on the vehicle state parameters is preferentially selected as compared to the command for the feedforward control (second command value) by the dynamic map.

The maximum-value selection unit 24 compares the $A_{FB}$ command value output from the operation-stability controller 13, the $B_{FB}$ command value output from the ride-comfort controller 22, and the FF command value output from the dynamic-map controller 14 and corrected by the command-value correction unit 23, and selects a command value that is most on the hard side (large value) as a final command value. In such a manner, the controller 21 determines a command value for the variable damper 6 based on the $A_{FB}$ command value and the $B_{FB}$ command value each being the first command value and the FF command value being the second command value. The maximum-value selection unit 24 outputs a command signal (command electric current) given in accordance with the selected command value to the damping-force variable actuator 7. In such a manner, the controller 21 controls the damping force generated by the variable damper 6 in accordance with the command value.

In this manner, also in the second embodiment, substantially the same actions and effects as those of the first embodiment can be obtained. Further, in the second embodiment, the feedback control by the ride-comfort controller 22 is added. Thus, even when the feedforward control by the dynamic-map controller 14 cannot be performed, the vibration of the vehicle body 1 in the vertical direction can be suppressed, and the ride comfort can be improved.

Further, the controller 21 preferentially selects the $A_{FB}$ command value and the $B_{FB}$ command value being the first values and determines a command value for the variable damper 6. Specifically, the controller 21 includes the command-value correction unit 23 for correcting the FF command value from the dynamic-map controller 14. Thus, when the command-value correction unit 23 compares the path plan and the current position and determines that the current position deviates from the path plan, in order to prevent uncertain control, the command-value correction unit 23 corrects the FF command value to zero. Accordingly, when the current position deviates from the path plan, the feedback control by the operation-stability controller 13 and the ride-comfort controller 22 is preferentially executed. As a result, for example, even when the information on the cloud C is old, and an actual road surface condition involves unexpected road-surface roughness, vehicle speed, and curvature due to construction work or accidents, the controller 21 can perform the feedback control for the variable damper 6 with the operation-stability controller 13 and the ride-comfort controller 22. Thus, even when the communication with the cloud C is interrupted, the variable damper 6 can be appropriately controlled.

In the second embodiment, the ride-comfort controller 22 calculates the target damping coefficient with the control law by the linear optimal control. The present invention is not limited to this, and the ride-comfort controller may determine the target damping coefficient or the target damping force with, for example, the skyhook control or the feedback control such as H∞ control.

Figure 6:
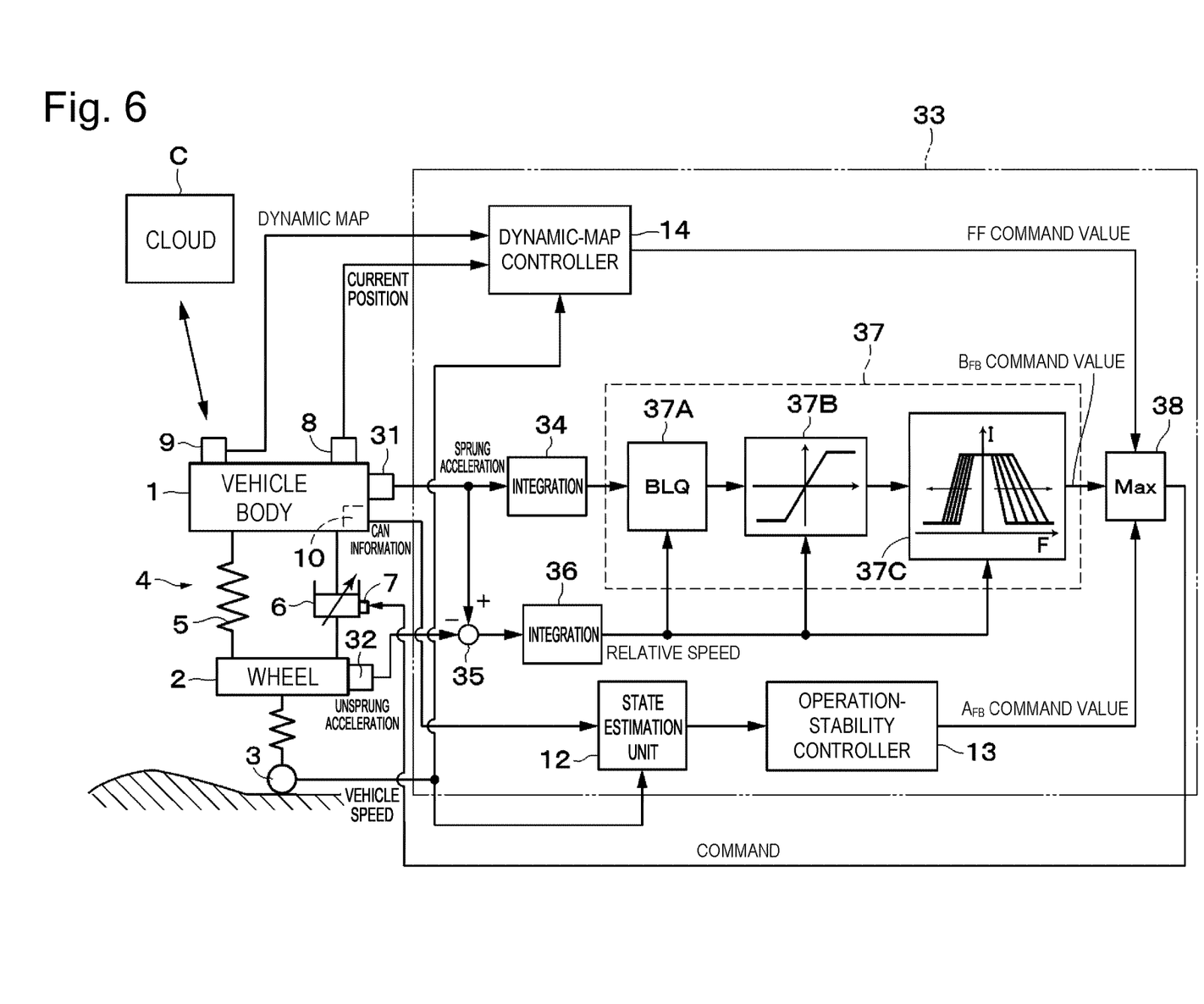
FIG. 6 is an overall configuration diagram for illustrating a suspension control apparatus according to a third embodiment of the present invention.

Next, FIG. 6 shows a third embodiment. The third embodiment is characterized in that, in order to detect a motion of the vehicle, acceleration sensors in the vertical direction are mounted to the vehicle. In the third embodiment, the same components as those of the first embodiment described above are denoted by the same reference symbols, and a description thereof is omitted.

A sprung acceleration sensor 31 and an unsprung acceleration sensor 32 are upper and lower acceleration detectors mounted to the vehicle. The sprung acceleration sensor 31 and the unsprung acceleration sensor 32 are included in the motion detector.

The sprung acceleration sensor 31 is provided on the vehicle body 1 side of the vehicle. The sprung acceleration sensor 31 detects a vibration acceleration in the vertical direction on the vehicle body 1 side being a sprung side and outputs a detection signal thereof to a controller 33 described later.

The unsprung acceleration sensor 32 is provided on the wheel 2 side of the vehicle. The unsprung acceleration sensor 32 detects a vibration acceleration in the vertical direction on the wheel 2 side being an unsprung side and outputs a detection signal thereof to the controller 33 described later.

The controller 33 of the third embodiment has substantially the same configuration as that of the controller 11 of the first embodiment, and is a control device provided inside the vehicle for adjusting a force generated by the variable damper 6. The controller 33 is formed of, for example, a microcomputer.

As illustrated in FIG. 6, the controller 33 includes integrators 34 and 36 and a subtractor 35. The integrator 34 integrates the detection signal from the sprung acceleration sensor 31 to compute a sprung speed being a speed of the vehicle body 1 in the vertical direction. The integrator 34 outputs the sprung speed.

The subtractor 35 subtracts the detection signal from the unsprung acceleration sensor 32 from the detection signal from the sprung acceleration sensor 31 to compute a difference between the sprung acceleration and the unsprung acceleration. In this case, the differential value corresponds to a relative acceleration between the vehicle body 1 and the wheel 2.

The integrator 36 integrates the relative acceleration output from the subtractor 35 to compute the relative speed in the vertical direction between the vehicle body 1 and the wheel 2. The integrator 36 outputs the relative speed.

Further, the controller 33 includes the state estimation unit 12, the operation-stability controller 13, a ride-comfort controller 37, the dynamic-map controller 14, and a maximum-value selection unit 38.

The ride-comfort controller 37 has a configuration similar to that of the ride-comfort controller 22 of the second embodiment. The ride-comfort controller 37 is an internal command calculation unit for calculating a first command value for the variable damper 6 (force generating mechanism) based on the sprung acceleration and the unsprung acceleration (internal information) output from the sprung acceleration sensor 31 and the unsprung acceleration sensor 32. Specifically, the ride-comfort controller 37 outputs a $B_{FB}$ command value (first command value) for reducing sprung vertical vibration based on a sprung speed output from the integrator 34 and a relative speed between a sprung part (vehicle body 1) and an unsprung part (wheel 2) output from the integrator 36. The ride-comfort controller 37 includes a bilinear optimal controller 37A (hereinafter referred to as "BLQ 37A"), a damping-coefficient limit unit 37B, and a damping-force map 37C, which are similar to the BLQ 22A, the damping-coefficient limit unit 22B, and the damping-force map 22C of the second embodiment.

Based on the bilinear optimal control theory, the BLQ 37A calculates a damping coefficient (target damping coefficient) of the variable damper 6 for reducing the vertical vibration of the sprung part from the sprung speed output from the integrator 34 and the relative speed output from the integrator 36. The damping-coefficient limit unit 37B adds limitation on the maximum value of the damping coefficient based on the relative speed in the vertical direction between the vehicle body 1 and the wheel 2. The damping-force map 37C calculates a $B_{FB}$ command value being a first command value to be output to the damping-force variable actuator 7 based on the damping coefficient output from the damping-coefficient limit unit 22B and the relative speed output from the integrator 36.

The maximum-value selection unit 38 compares the $A_{FB}$ command value output from the operation-stability controller 13, the $B_{FB}$ command value output from the ride-comfort controller 37, and the FF command value output from the dynamic-map controller 14, and selects a command value that is most on the hard side (large value) as a final command value. In such a manner, the controller 33 determines a command value for the variable damper based on the $A_{FB}$ command value and the $B_{FB}$ command value each being the first command value and the FF command value being the second command value. The maximum-value selection unit 38 outputs a command signal (command electric current) given in accordance with the selected command value to the damping-force variable actuator 7. In such a manner, the controller 33 controls the damping force generated by the variable damper 6 in accordance with the command value.

In this manner, also in the third embodiment, substantially the same actions and effects as those of the first embodiment can be obtained. Further, the suspension control apparatus according to the third embodiment includes the sprung acceleration sensor 31 and the unsprung acceleration sensor 32 mounted to the vehicle. The controller 33 performs integration operation on the signals from the sprung acceleration sensor 31 and the unsprung acceleration sensor 32 to calculate the sprung speed and the relative speed. Thus, the vehicle behavior can be directly detected, thereby being capable of enhancing the effect of the feedback control such as the ride-comfort control.

When the operation-stability controller 13 uses the relative speed to calculate the $A_{FB}$ command value, the relative speed output from the integrator 36 may be used in place of a relative speed acquired based on the vehicle state parameters from the state estimation unit 12.

Figure 7:
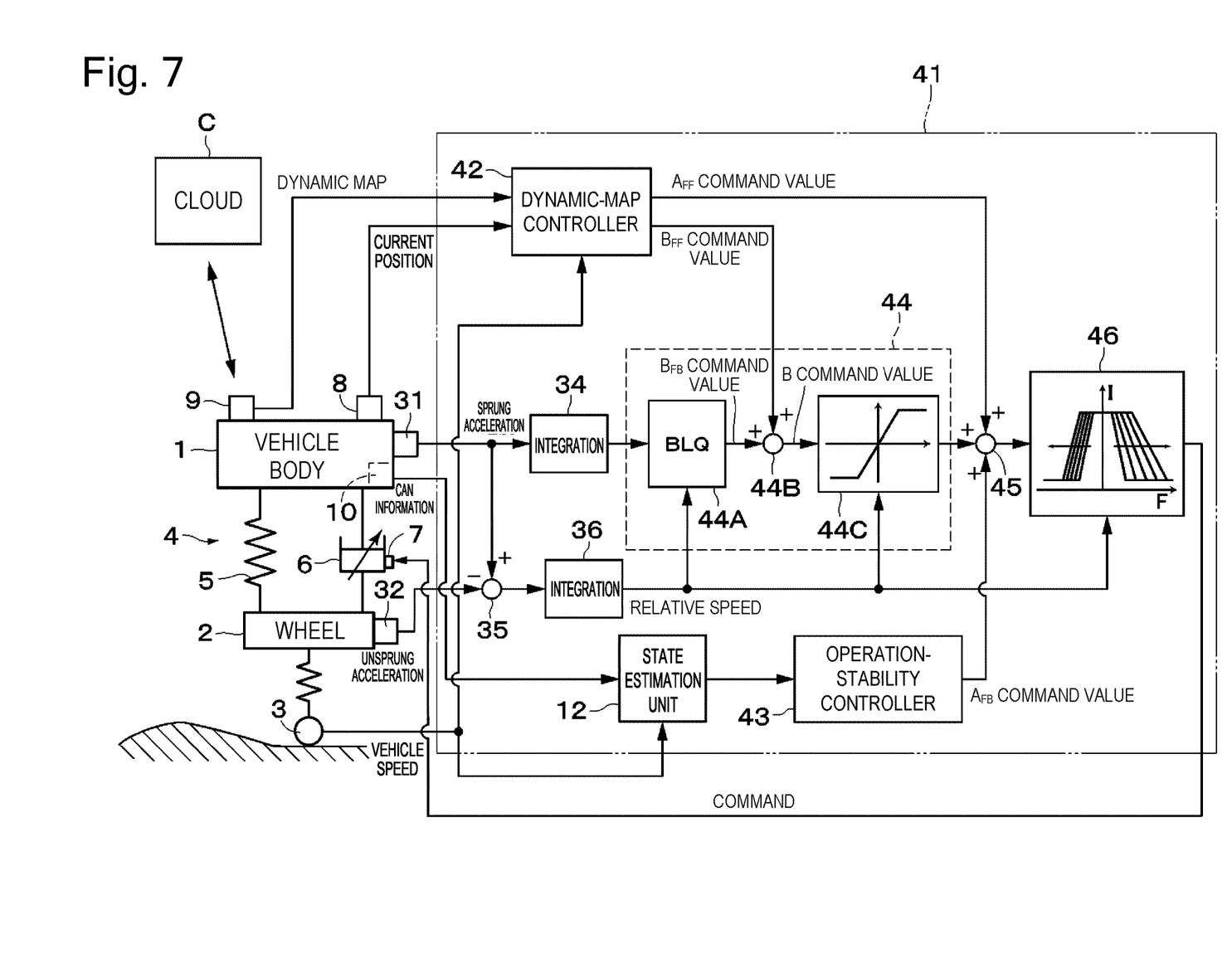
FIG. 7 is an overall configuration diagram for illustrating a suspension control apparatus according to a fourth embodiment of the present invention.

Next, FIG. 7 shows a fourth embodiment. The fourth embodiment is characterized in that the dynamic-map controller and the ride-comfort controller calculate command values each being a damping coefficient and in that the controller limits magnitudes of those command values to determine a command value for the variable damper. In the fourth embodiment, the same components as those of the third embodiment described above are denoted by the same reference symbols, and a description thereof is omitted.

A controller 41 of the fourth embodiment has substantially the same configuration as that of the controller 33 of the third embodiment, and is a control device provided inside the vehicle for adjusting a force generated by the variable damper 6. The controller 41 is formed of, for example, a microcomputer.

As illustrated in FIG. 7, the controller 41 includes the integrators 34 and 36 and the subtractor 35. Further, the controller 41 includes the state estimation unit 12, a dynamic-map controller 42, an operation-stability controller 43, a ride-comfort controller 44, an adder 45, and a damping-force map 46.

The dynamic-map controller 42 is an external command calculation unit for calculating a second command value for the variable damper 6 based on the dynamic map (external information) received from the communication unit 9. The dynamic-map controller 42 has a configuration similar to that of the dynamic-map controller 14 of the first embodiment. However, the dynamic-map controller 42 calculates a target damping coefficient for improving the operation stability as an operation-stability feedforward command value (hereinafter referred to as "$A_{FF}$ command value") in accordance with the current position and the vehicle speed of the vehicle, based on the dynamic map. In addition, the dynamic-map controller 42 calculates a target damping coefficient for improving the ride comfort as a ride-comfort feedforward command value (hereinafter referred to as "$B_{FF}$ command value") in accordance with the current position and the vehicle speed of the vehicle, based on the dynamic map. The $A_{FF}$ command value and the $B_{FF}$ command value are each a second command value calculated based on the dynamic map received from the communication unit 9.

The operation-stability controller 43 is an internal command calculation unit for calculating a first command value for the variable damper 6 (force generating mechanism) based on the vehicle state parameters (internal information) output from the state estimation unit 12 (motion detector). The operation-stability controller 43 calculates such an $A_{FB}$ command value being a damping coefficient (target damping coefficient) that a damping-force characteristic of the variable damper 6 becomes harder, for example, as the lateral acceleration becomes larger. The $A_{FB}$ command value is a first command value calculated based on the vehicle state parameters output from the state estimation unit 12.

The ride-comfort controller 44 is an internal command calculation unit for calculating a first command value for the variable damper 6 (force generating mechanism) based on the sprung acceleration and the unsprung acceleration (internal information) output from the sprung acceleration sensor 31 and the unsprung acceleration sensor 32. Specifically, the ride-comfort controller 44 calculates a $B_{FB}$ command value (first command value) being a damping coefficient (target damping coefficient) for reducing vertical vibration of a sprung part based on a sprung speed output from the integrator 34 and a relative speed between a sprung part (vehicle body 1) and an unsprung part (wheel 2) output from the integrator 36. The ride-comfort controller 44 outputs a B command value for improving the ride comfort based on the calculated $B_{FB}$ command value and the $B_{FF}$ command value input from the dynamic-map controller 42. The ride-comfort controller 44 includes a bilinear optimal controller 44A (hereinafter referred to as "BLQ 44A"), an adder 44B, and a damping-coefficient limit unit 44C.

Based on the bilinear optimal control theory, the BLQ 44A calculates, as the $B_{FB}$ command value, a damping coefficient (target damping coefficient) of the variable damper 6 for reducing the vertical vibration of the sprung part from the sprung speed output from the integrator 34 and the relative speed output from the integrator 36.

The adder 44B adds the $B_{FB}$ command value being a damping coefficient output from the BLQ 44A and the $B_{FF}$ command value being a damping coefficient output from the dynamic-map controller 42. The adder 44B outputs the added damping coefficient to the damping-coefficient limit unit 44C.

The damping-coefficient limit unit 44C independently limits a positive value and a negative value of the maximum value of the damping coefficient, respectively. The damping-coefficient limit unit 44C adds limitation on the maximum value of the damping coefficient based on the relative speed in the vertical direction between the vehicle body 1 and the wheel 2. In such a manner, in order to improve the ride comfort, the ride-comfort controller 44 outputs the B command value being a damping coefficient having a limited maximum value.

The adder 45 adds the $A_{FB}$ command value being a damping coefficient output from the operation-stability controller 43, the B command value being a damping coefficient output from the ride-comfort controller 44, and the $A_{FF}$ command value being a damping coefficient output from the dynamic-map controller 42. The adder 44B outputs the added damping coefficient to the damping-force map 46.

The damping-force map 46 receives input of the damping coefficient output from the adder 45 and input of the relative speed output from the integrator 36. The damping-force map 46 is a map in which a relationship between a target damping coefficient and a command value is variably set in accordance with the relative speed. The damping-force map 46 calculates a command value to be output to the damping-force variable actuator 7 based on the damping coefficient output from the adder 45 and the relative speed output from the integrator 36.

In this manner, also in the fourth embodiment, substantially the same actions and effects as those of the first and third embodiments can be obtained. Further, in the fourth embodiment, the dynamic-map controller 42 outputs the $A_{FF}$ command value and the $B_{FF}$ command value each being a damping coefficient. The ride-comfort controller 44 adds the calculated $B_{FB}$ command value being a damping coefficient calculated based on the sprung speed and the relative speed and the $B_{FF}$ command value from the dynamic-map controller 42, and thereafter outputs a B command value having the damping-coefficient limitation applied thereto. The controller 41 inputs a target damping coefficient obtained by adding the $A_{FB}$ command value output from the operation-stability controller 43, the B command value output from the ride-comfort controller 44, and the $A_{FF}$ command value output from the dynamic-map controller 42 and a relative speed to the damping-force map 46 to calculate a final command value. The controller 41 controls the variable damper 6 based on the final command value. In such a manner, the damping-coefficient limitation is applied to the B command value for performing the ride-comfort control to suppress a sharp change in damping force. In contrast, the $A_{FB}$ command value and the $A_{FF}$ command value for performing the operation stability control are command values having no limitation. In such a manner, a rise of the operation stability control command is maintained, thereby being capable of improving the operation stability performance.

In the fourth embodiment, the command values ($A_{FB}$ command value, $A_{FF}$ command value, $B_{FB}$ command value, and $B_{FF}$ command value) being the target damping coefficients are used. The present invention is not limited to this, and command values being the target damping force may be used. In this case, the damping-force map is a map indicating a relationship among the target damping force, the relative speed, and the command value. The controller may calculate the command values based on the damping-force map.

Further, in the fourth embodiment, the command values ($A_{FF}$ command value and $B_{FF}$ command value) output from the dynamic map serve as commands for maintaining a constant damping ratio to absorb the difference in magnitudes of the command values in the vehicle specifications. The damping ratio can be expressed by the following expression of Math. 1, with a sprung mass "m", a suspension spring constant "k", and a suspension damping coefficient "c".

$$\zeta = \frac{c}{\sqrt{mk}} \qquad [\text{Math. 1}]$$

In such a manner, in order to have a constant damping ratio $\zeta$, it is only required that the damping coefficient "c" of the suspension be set as expressed by the expression of Math. 2 in accordance with the damping ratio $\zeta$, the sprung mass "m", and the suspension spring constant "k".

$$c = \zeta \times 2\sqrt{mk} \qquad [\text{Math. 2}]$$

Here, in a case in which correction is to be made with respect to a basic setting, when there are provided the basic setting of 1, a current vehicle of 2, and a correction coefficient of G with respect to the target damping coefficient "c", it can be expressed by the following expression of Math. 3. In such a manner, through multiplication of the target damping coefficient (target damping force) of the basic setting by the correction coefficient G, the difference in magnitudes of the command values caused by the difference in specifications can be absorbed.

$$G = \frac{c_2}{c_1} = \frac{\sqrt{m_2 k_2}}{\sqrt{m_1 k_1}} \qquad [\text{Math. 2}]$$

Further, an appropriate control timing varies depending on a characteristic frequency, and such variation can be dealt with by transmitting the specification information of the vehicle from the vehicle side in advance on the cloud and outputting a command given in accordance with the specification from the cloud. Basically, a timing of the command is earlier as the characteristic frequency of the vehicle is higher, and the timing of the command is later as the characteristic frequency is lower.

In each of the embodiments described above, description has been given while exemplifying the case in which the force generating mechanism configured to generate an adjustable force between the vehicle body 1 side and the wheel 2 side is formed of the variable damper 6 formed of a hydraulic shock absorber of a damping-force adjustment type. However, the present invention is not limited to this. For example, as an alternative to the hydraulic shock absorber, the force generating mechanism may be formed of, for example, an air suspension, a stabilizer (kinematic suspension), or an electromagnetic suspension.

In each of the embodiments described above, description has been given while exemplifying the case in which the cloud C serves as the external database. The present invention is not limited to this. For example, the external database may be a database of a server computer provided outside the vehicle. Further, the external information is not limited to the dynamic map, and may be any information including a command value for a variable damper given in accordance with a position and a vehicle speed.

In each of the embodiments described above, description has been given while exemplifying the case of a suspension control apparatus to be used for a four-wheeled vehicle. The present invention is not limited to this, and may be applicable also to, for example, a two-wheeled vehicle, a three-wheeled vehicle, a working vehicle, or a transport vehicle such as a truck and a bus.

The embodiments described above are examples, and it goes without saying that partial replacement or combination of the configurations presented in the different embodiments can be made.

Next, as a suspension control apparatus included in the embodiments described above, for example, those having the following modes are conceivable.

A suspension control apparatus according to a first mode includes: a force generating mechanism, which is provided between a vehicle body side and a wheel side of a vehicle, and is allowed to adjust a force to be generated; a receiving unit, which is provided inside the vehicle, and is configured to receive external information from an external database provided outside the vehicle; and a control device, which is provided inside the vehicle, and is configured to adjust the force generated by the force generating mechanism, in which the control device includes: a motion detector, which is provided inside the vehicle, and is configured to detect a motion of the vehicle; an internal command calculation unit configured to calculate a first command value for the force generating mechanism based on internal information output from the motion detector; and an external command calculation unit configured to calculate a second command value for the force generating mechanism based on the external information received from the receiving unit, and the control device determines a command value for the force generating mechanism from the first command value and the second command value.

A second mode is characterized in that, in the first mode, the internal command calculation unit calculates the first command value based on CAN information provided to the vehicle.

A third mode is characterized in that, in the first or second mode, the motion detector includes a vertical acceleration detector mounted to the vehicle.

A fourth mode is characterized in that, in any one of the first to third modes, the control device preferentially selects the first command value and determine a command value for the force generating mechanism.

A fifth mode is characterized in that, in any one of the first to fourth modes, the external information is the second command value for the force generating mechanism determined in accordance with a road surface and a vehicle speed.

A sixth mode is characterized in that, in any one of the first to fifth modes, the first command value and the second command value are each a damping coefficient, and the control device limits a magnitude of the damping coefficient of the first command value and the damping coefficient of the second command value and determine a command value for the force generating mechanism.

Note that, the present invention is not limited to the embodiments described above, and includes further various modification examples. For example, in the embodiments described above, the configurations are described in detail in order to clearly describe the present invention, but the present invention is not necessarily limited to an embodiment that includes all the configurations that have been described. Further, a part of the configuration of a given embodiment can replace the configuration of another embodiment, and the configuration of another embodiment can also be added to the configuration of a given embodiment. Further, another configuration can be added to, deleted from, or replace a part of the configuration of each of the embodiments.

The present application claims a priority based on Japanese Patent Application No. 2019-060489 filed on Mar. 27, 2019. All disclosed contents including Specification, Scope of Claims, Drawings, and Abstract of Japanese Patent Application No. 2019-060489 filed on Mar. 27, 2019 are incorporated herein by reference in their entirety.

REFERENCE SIGNS LIST

1 vehicle body, 2 wheel, 3 vehicle-speed sensor, 4 suspension device, 6 variable damper (force generating mechanism), 7 damping-force variable actuator, 8 GPS receiver, 9 communication unit (receiving unit), 10 CAN, 11, 21, 33, 41 controller (control device), 12 state estimation unit (motion detector), 13, 43 operation-stability controller (internal command calculation unit), 14, 42 dynamic-map controller (external command calculation unit), 15, 24, 38 maximum-value selecting unit, 22, 37, 44 ride-comfort controller (internal command calculation unit), 31 sprung acceleration sensor (vertical acceleration detector), 32 unsprung acceleration sensor (vertical acceleration detector)

The invention claimed is:
1. A suspension control apparatus, comprising:
a force generating mechanism, which is provided between a vehicle body side and a wheel side of a vehicle, and is allowed to adjust a force to be generated;
a receiving unit, which is provided inside the vehicle, and is configured to receive external information from an external database provided outside the vehicle; and a control device, which is provided inside the vehicle, and is configured to adjust the force generated by the force generating mechanism,
wherein the control device includes:
a motion detector, which is provided inside the vehicle, and is configured to detect a motion of the vehicle;
an internal command calculation unit configured to calculate a first command value for the force generating mechanism based on internal information output from the motion detector; and
an external command calculation unit configured to calculate a second command value for the force generating mechanism based on the external information received from the receiving unit,
wherein the control device determines a command value for the force generating mechanism from the first command value and the second command value,
wherein the control device is configured to preferentially select the first command value and determine a command value for the force generating mechanism,
wherein the first command value and the second command value are each a damping coefficient, and
wherein the control device is configured to limit a magnitude of the damping coefficient of the first command value and the damping coefficient of the second command value and determine a command value for the force generating mechanism.

2. The suspension control apparatus according to claim 1, wherein the internal command calculation unit is configured to calculate the first command value based on CAN information provided to the vehicle.

3. The suspension control apparatus according to claim 1, wherein the motion detector includes a vertical acceleration detector mounted to the vehicle.

4. The suspension control apparatus according to claim 1, wherein the external information is the second command value for the force generating mechanism determined in accordance with a road surface and a vehicle speed.

5. The suspension control apparatus according to claim 2, wherein the motion detector includes a vertical acceleration detector mounted to the vehicle.

6. The suspension control apparatus according to claim 2, wherein the external information is the second command value for the force generating mechanism determined in accordance with a road surface and a vehicle speed.

7. The suspension control apparatus according to claim 3, wherein the external information is the second command value for the force generating mechanism determined in accordance with a road surface and a vehicle speed.

8. A suspension control apparatus, comprising:
a force generating mechanism, which is provided between a vehicle body side and a wheel side of a vehicle, and is allowed to adjust a force to be generated;
a receiving unit, which is provided inside the vehicle, and is configured to receive external information from an external database provided outside the vehicle; and
a control device, which is provided inside the vehicle, and is configured to adjust the force generated by the force generating mechanism,
wherein the control device includes:
a motion detector, which is provided inside the vehicle, and is configured to detect a motion of the vehicle;
an internal command calculation unit configured to calculate a first command value for the force generating mechanism based on internal information output from the motion detector, the first command being the command for the feedback control; and
an external command calculation unit configured to calculate a second command value for the force generating mechanism based on the external information received from the receiving unit, the second command value being the command for the feedforward control,
wherein the control device determines a command value for the force generating mechanism from the first command value and the second command value,
wherein in the case where the first command value becomes a larger value than the second command value, the control device is configured to preferentially select the first command value and determine a command value for the force generating mechanism,
wherein the internal command calculation unit is configured to calculate the first command value based on CAN information provided to the vehicle,
wherein the first command value and the second command value are each a damping coefficient, and
wherein the control device is configured to limit a magnitude of the damping coefficient of the first command value and the damping coefficient of the second command value and determine a command value for the force generating mechanism.

9. A suspension control apparatus, comprising:
a force generating mechanism, which is provided between a vehicle body side and a wheel side of a vehicle, and is allowed to adjust a force to be generated;
a receiving unit, which is provided inside the vehicle, and is configured to receive external information from an external database provided outside the vehicle; and
a control device, which is provided inside the vehicle, and is configured to adjust the force generated by the force generating mechanism,
wherein the control device includes:
a motion detector, which is provided inside the vehicle, and is configured to detect a motion of the vehicle;
an internal command calculation unit configured to calculate a first command value for the force generating mechanism based on internal information output from the motion detector, the first command being the command for the feedback control; and
an external command calculation unit configured to calculate a second command value for the force generating mechanism based on the external information received from the receiving unit, the second command value being the command for the feedforward control,
wherein the control device determines a command value for the force generating mechanism from the first command value and the second command value,
wherein in the case where the first command value becomes a larger value than the second command value, the control device is configured to preferentially select the first command value and determine a command value for the force generating mechanism,
wherein the motion detector includes a vertical acceleration detector mounted to the vehicle,
wherein the first command value and the second command value are each a damping coefficient, and
wherein the control device is configured to limit a magnitude of the damping coefficient of the first command value and the damping coefficient of the second command value and determine a command value for the force generating mechanism.

10. A suspension control apparatus, comprising:

a force generating mechanism, which is provided between a vehicle body side and a wheel side of a vehicle, and is allowed to adjust a force to be generated;

a receiving unit, which is provided inside the vehicle, and is configured to receive external information from an external database provided outside the vehicle; and a control device, which is provided inside the vehicle, and is configured to adjust the force generated by the force generating mechanism, wherein the control device includes:

a motion detector, which is provided inside the vehicle, and is configured to detect a motion of the vehicle;

an internal command calculation unit configured to calculate a first command value for the force generating mechanism based on internal information output from the motion detector, the first command being the command for the feedback control; and an external command calculation unit configured to calculate a second command value for the force generating mechanism based on the external information received from the receiving unit, the second command value being the command for the feedforward control, wherein the control device determines a command value for the force generating mechanism from the first command value and the second command value, wherein in the case where the first command value becomes a larger value than the second command value, the control device is configured to preferentially select the first command value and determine a command value for the force generating mechanism, wherein the external information is the second command value for the force generating mechanism determined in accordance with a road surface and a vehicle speed, wherein the first command value and the second command value are each a damping coefficient, and wherein the control device is configured to limit a magnitude of the damping coefficient of the first command value and the damping coefficient of the second command value and determine a command value for the force generating mechanism.

* * * * *